United States Patent [19]
Smith

[11] 3,712,131

[45] Jan. 23, 1973

[54] HEAT FLUX INDICATOR

[76] Inventor: Warren K. Smith, 100 Coral Sea Circle, China Lake, Calif. 93555

[22] Filed: Feb. 22, 1971

[21] Appl. No.: 117,473

[52] U.S. Cl. ............................................. 73/190 H
[51] Int. Cl. ............................................. G01k 17/00
[58] Field of Search ....... 73/DIG. 7, 340, 190 H, 339; 264/271

[56] References Cited

UNITED STATES PATENTS

| | | | |
|---|---|---|---|
| 2,780,150 | 2/1957 | Yeoman | 264/271 |
| 2,948,947 | 8/1960 | Berg | 264/271 |
| 3,238,775 | 3/1966 | Watts | 73/190 H |

*Primary Examiner*—Louis R. Prince
*Assistant Examiner*—Denis E. Corr
*Attorney*—R. S. Sciascia, Roy Miller and Gerald F. Baker

[57] ABSTRACT

An inexpensive passive heat flux sensor and recording device for measurements in fires or other hot environments comprising a pair of small spring steel strips of different thicknesses, heat treated to maximum hardness. The strips are fastened together back-to-back with asbestos paper insulation between them, or they are mounted side-by-side on a piece of asbestos millboard. After immersion in a fire the two steel pieces are tested for Rockwell C hardness, which is referred to a set of charts prepared with the aid of a computer program. The charts give the average heat flux and the time from beginning of exposure to approximately the maximum temperature of the steel pieces. It is also possible to calculate the approximate flame temperature from the data.

6 Claims, 7 Drawing Figures

PATENTED JAN 23 1973 3,712,131
SHEET 1 OF 4
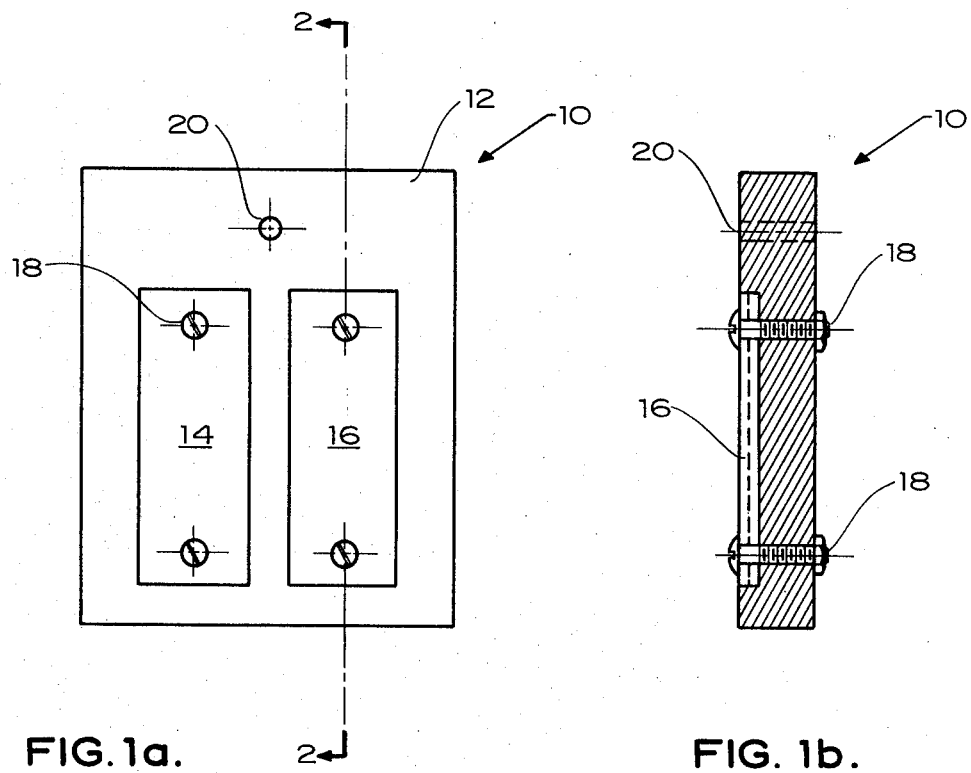
FIG. 1a.
FIG. 1b.
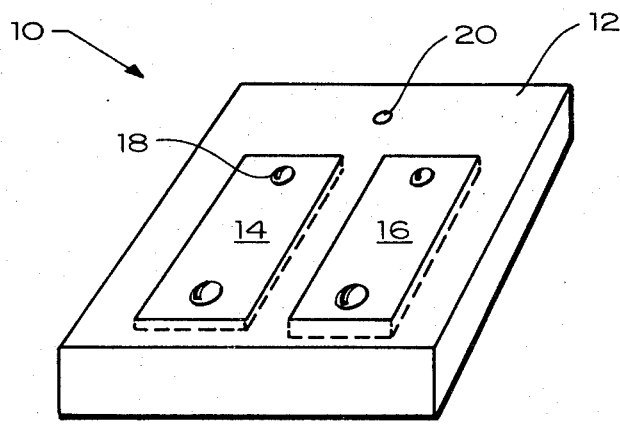
FIG. 1c.
INVENTOR.
WARREN K. SMITH
BY ROY MILLER
ATTORNEY
GERALD F. BAKER
AGENT.

HEAT FLUX INDICATOR

BACKGROUND OF THE INVENTION

Fires are notably difficult to instrument for temperature and heat flux measurements. Sensors must be durable in the hot environment, and recorders or telemetering equipment also must be well-protected or located at a safe distance from the fire. Even the wiring for such apparatus must be protected, usually by burying it in the ground. Fires, because of their non-homogenious nature and the effects of even slight winds, necessitate the use of many sensing units to get reasonably representative data. This requirement multiplies greatly the cost of studying large fires. There are also many instances where insufficient time is available for extensive preparation of electrical instrumentation. Obviously, then, a small inexpensive passive heat flux sensing and recording device is highly desirable, even if the results are semi-quantitative.

A thermal sensor for the purpose described above must depend upon some irreversible physical change in a material or mechanism. It should be stable in the environment before and after the fire. For example, a liquid may evaporate considerably before and after a fire and thus obscure the amount driven off by the fire. The device should be simple and inexpensive to construct and yet competent to provide the required measurements after use. Phase changes, color changes, and melting of solids offer attractive possibilities. Such devices indicate maximum temperatures attained, but usually over narrow temperature ranges. In some cases, the changes are time-dependent and, unless the exposure time is accurately known, the indicated temperatures may be considerably in error.

Certain metal alloys can be hardened by precipitation of finely divided constituents from supersaturated solid solutions. Aluminum alloys of the duralumin type are good examples of this. They can dissolve up to about 4.5 percent of copper within a narrow temperature range above 900° F. However, the solubility is very much less than this at room temperature and, when such a solid solution is quenched rapidly to room temperature—too rapidly for any precipitation—an unstable composition results. Precipitation then proceeds at a rate governed by temperature and time. Hardness of the alloy increases as the precipitation sensor proceeds until at any aging temperature a maximum hardness is reached. Thereafter particle growth causes a progressive softening. The use of such a system as a sensor of temperature or heat flux is complicated by the presence of a hardness maximum. Only if time of exposure is known fairly well can age-hardening be used for this purpose. However, if the alloy is first placed in the condition of maximum aged hardness before use as a sensor, then the over-aging mechanism of softening with time and temperature may be useful.

The tempering of a hardened steel appears to have a number of advantages over other metal systems for measuring heat flux. Steel is inexpensive, readily available, and quite durable in the expected environments. Its high melting temperature of about 2,700° F. precludes destruction, and the tempering range is from about 300° F. to 1,333° F. The temperature-time-hardness relation for carbon steels was thoroughly investigated by Holloman and Jaffee, (Time-temperature Relations in Tempering Steels, by Holloman, J. H. and L. D. Jaffee. Trans. Am. Inst. Mining Metal Eng., 162, pp 223 – 249, 1945.) while Bain (American Society for Metals, The Alloying Elements in Steel by E. C. Bain, pp 228 – 312.) reports on that for alloy steels. The use of the tempering mechanism in steels for the indication of temperatures in difficult locations is not new, as evidenced by the British publication on "Templugs." (Templugs, by P. R. Belcher and R. W. Wilson. The Engineer, Vol. 221, Feb. 25, 1966, pp 305 – 8.) However, it is necessary to know the exposure time for the Templugs, and it is assumed they must be at a constant service temperature.

The purpose of this invention is to provide a method and apparatus for temperature sensing whereby time as well as temperature may be accounted for by hardness reduction of hardened steel specimens. With time and temperature information in hand, and certain assumptions concerning the nature of the heating environment, it is possible to calculate the average heat flux and flame temperature.

BRIEF DESCRIPTION OF THE SEVERAL VIEWS OF THE DRAWINGS

FIG. 1a is a top elevational view of a first embodiment;

FIG. 1b is a sectional view taken along line 2 — 2 of FIG. 1;

FIG. 1c is a perspective view of the embodiment of FIG. 1;

DESCRIPTION OF THE INVENTION

Figure 2:
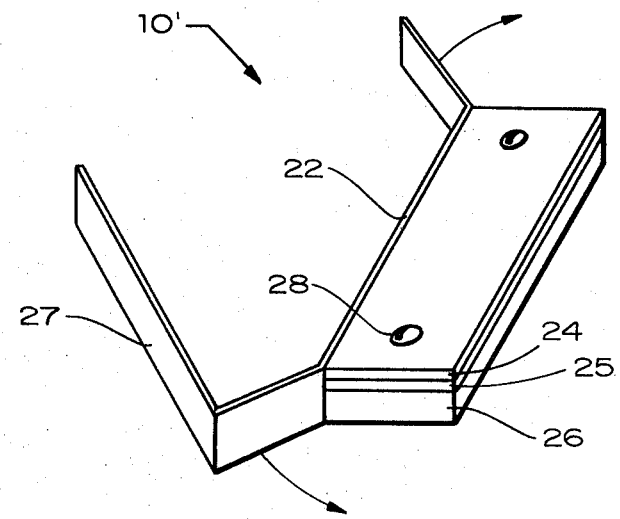
FIG. 2 is a perspective view of a second embodiment.

One embodiment of a heat flux indicator according to the present invention is shown at 10 in FIGS. 1a, 1b, and 1c. The indicator consists of two pieces 14, 16 of fully hardened, high carbon steel flats of different thicknesses. In one such indicator tested the thickness of steel flats 14, 16 was 0.050 inches and 0.125 inches respectively. The two steel pieces were each three-fourths inch by 2 inch in this example.

The steel pieces are embedded in an asbestos insulating board 12 flush with one surface and with at least one-fourth inch of the asbestos backing the steel pieces. The steel pieces are preferably fastened into the asbestos backing by means of small bolts 18. The small hole 20 in the asbestos board was provided in this embodiment as a means for fastening the device into position within a test environment. The exposed faces of the steel pieces in this embodiment may be coated with a flat black paint or pigment if radiant and convective heat flux is to be measured or they may be chrome plated and polished if only convective heat flux measurement is desired.

An alternative construction is shown at 10' in FIG. 2 wherein the steel strips 24, 26 are separated by an asbestos sheet 25 and the "sandwich" is surrounded by an asbestos edging 27. The edging should be ample to shield the edges of the steel pieces from direct flame heating and advantageously may be slightly oversize for that purpose. The sandwich is held together in this example by bolts 28.

The example in FIG. 2 may be further varied by using two steel flats of the same thickness made from different steel having widely differing tempering rates such as AISI 1040 and AISI 4140 steel. In this case the steel pieces can be placed back-to-back without any insulation between.

Figure 3:
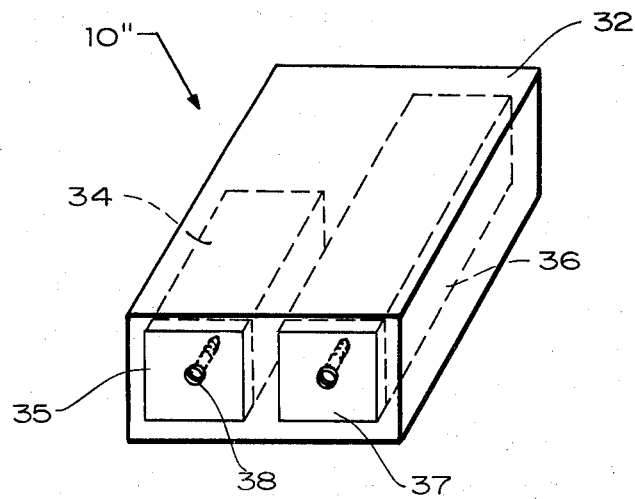
FIG. 3 is a perspective view of a third embodiment.

A still further embodiment is shown in FIG. 3 wherein two steel blocks 35, 37 are fastened to high conducting heat sinks 34, 36 and encased in a block 32 with the faces of steel exposed. The time range of this device can be extended by attaching to each piece of steel an appropriate high conductivity heat sink for example of copper in good thermal contact with the steel and otherwise insulated from the fire. Note that heat sinks are of different lengths, preferrably 2:1. The difference in length gives a differential in temperature rise.

A still further variation may be made by employing more than two thicknesses of steel flats mounted on an asbestos block whereby a wider range of fire conditions may be investigated. In this case, it is possible after the fire to select the pair of thicknesses yielding the most sensitive results.

TEMPERING OF STEEL

A brief simplified discussion of the nature of hardening and tempering of steel may be useful in introducing the application thereof to the measurement of heat flux (i.e., the flow of energy through the surface in calories/cm²/second). Upon heating to an elevated temperature, iron changes from a body-centered to a face-centered cubic crystal structure. The low temperature (alpha) form of the iron can hold only about 0.008 percent of carbon in solid solution, whereas the high temperature form (gamma) can dissolve as much as 1.67 percent of carbon. If a 1 percent carbon steel has been heated to a proper temperature, all of the iron carbide present will dissolve in the iron to form the solid solution known as austenite. If the austenite is cooled slowly down to room temperature, the iron carbides separate out again in groups of platelets with layers of pure iron sandwiched between them. The sandwiches, quite soft, are called pearlite. In order for this transformation to take place, diffusion of the carbon atoms in the iron must occur, and diffusion requires time. Now, if instead of cooling the austenite slowly, it is plunged into cold water, there is not time for diffusion, and a different product forms. This product is called martensite. It is a needle-like, highly strained, tetragonal structure holding all the carbon in some form. Its hardness is about 67 on the Rockwell C scale for the carbon content of 1.0 percent.

As will be apparent from the above specification and the accompanying drawings, an inexpensive simple device has been developed which provides means to indicate and record heat flux in large fires without the need for electrical instrumentation. Although the Rockwell C hardness test must be made with the utmost care in techniques and calibration, it has been shown that acceptable accuracy can be achieved with this device. The use of two thicknesses of steel strip specimens allows the simultaneous solution of the heat balancing equation for both time and temperature.

OPERATION

For measurement in fires or other hot environments the steel strips or flats are first heat treated to maximum hardness. The strips are fastened together back-to-back with asbestos paper insulation between them or mounted side by side on a piece of asbestos millboard as described above. After immersion in a fire or hot environment, the strips are tested for Rockwell C hardness. The values observed are plotted on a set of charts (FIGS. 4 and 5) prepared by means of a computor program to find (in FIG. 4) the average heat flux in calories/per cm²/second and (in FIG. 5) the time of exposure from the beginning of exposure to approximately the time of maximum temperature.

In the example shown in the charts (FIGS. 4 and 5) the sample strips were of 0.025 and 0.050 thickness respectively.

For comparison purposes, for example, suppose a Rockwell Hardness of 40 for the 0.025 inch strip and a valve of 52 for the 0.050 inch piece. Plotting these values on the FIG. 4 chart determines a point midway between curve B (1.0 calories/cm²/second) and curve C (1.5 calories/cm²/second) and by interpolation a value of 1.25 calories/cm²/second is indicated.

Applying the above value to a time chart (FIG. 5) for a 0.050 inch sample and locating a point (1.25) between curves B and C on Rockwell Hardness line 52, the time of exposure (approximately 60 seconds) is indicated.

Figure 4:
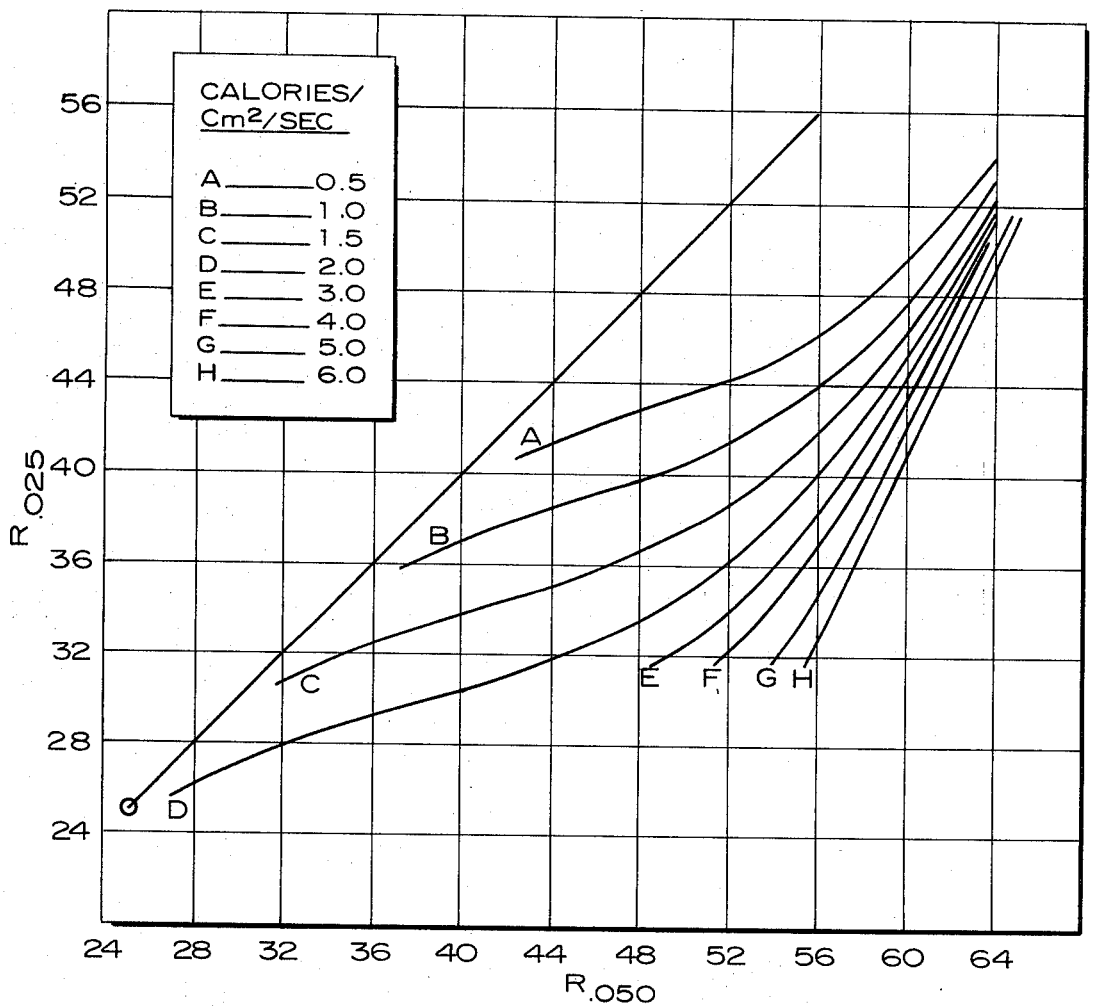
FIGS. 4 and 5 are temperature charts.
Figure 5:
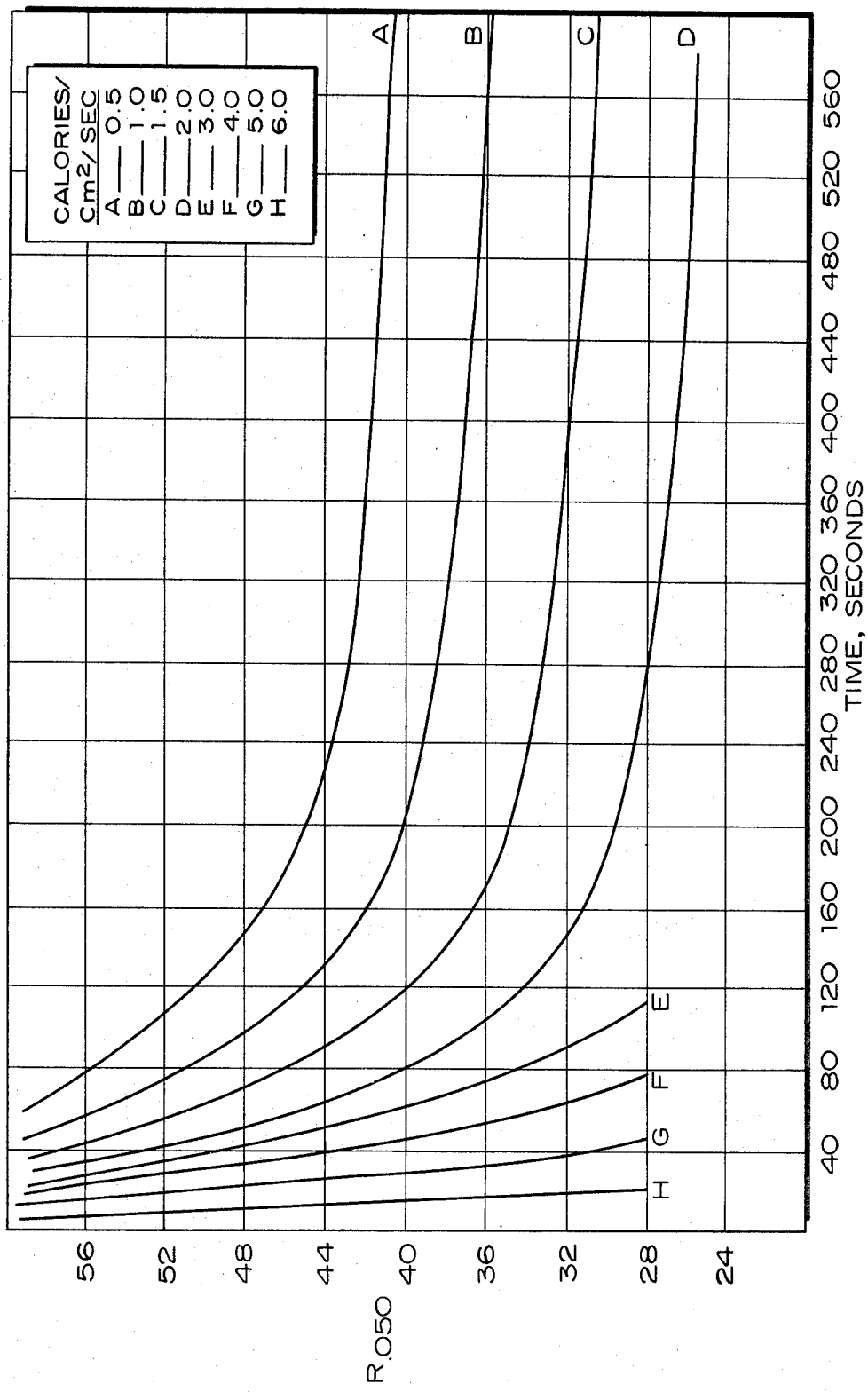

By referring to two charts, FIGS. 4 and 5, as an example, both heat flux and time of exposure are obtained when the final hardness of the two steel flats is known.

What is claimed is:

1. A pyrometric device comprising
a plurality of fully hardened high carbon steel elements encased in a fireproof material;
each of said elements having approximately equal planar exposed surfaces flush with an outer surface of said fireproof material.

2. The device of claim 1 wherein
said steel elements consist of flat elements of differing thicknesses disposed on one surface of said fireproof material in side-by-side relationship.

3. The indicator device of claim 2 wherein the ratio of said thicknesses is approximately 2:1.

4. The device of claim 1 wherein said elements are of like dimension; and heat sinks of differing thickness attached to respective elements.

5. The device of claim 1 wherein said elements are separated by fireproof material so that opposite faces are exposed.

6. The method of obtaining heat flux measurements in large fires comprising:
placing a plurality of fully hardened high carbon steel elements having equal exposed surfaces and varying thicknesses in a fire;
removing the steel elements from the area after the fire and subjecting said elements to a test for hardness on a Rockwell hardness tester using the C scale; and
comparing the hardness of the samples to ascertain the effects of the fire on each.

* * * * *